US010557382B2

(12) United States Patent
Fawley (10) Patent No.: US 10,557,382 B2
(45) Date of Patent: Feb. 11, 2020

(54) VALVE CLEARANCE SETTING AND ADJUSTMENT SYSTEMS AND RELATED METHODS (71) Applicant: R. Bradford Fawley, Guilford, VT (US)

(72) Inventor: R. Bradford Fawley, Guilford, VT (US)

(*) Notice: Subject to any disclaimer, the term of this patent is extended or adjusted under 35 U.S.C. 154(b) by 118 days.

(21) Appl. No.: 15/549,293

(22) PCT Filed: Feb. 10, 2016

(86) PCT No.: PCT/US2016/017334
§ 371 (c)(1),
(2) Date: Aug. 7, 2017

(87) PCT Pub. No.: WO2016/130664
PCT Pub. Date: Aug. 18, 2016

(65) Prior Publication Data
US 2018/0274395 A1 Sep. 27, 2018

Related U.S. Application Data (60) Provisional application No. 62/277,087, filed on Jan. 11, 2016, provisional application No. 62/114,972, filed on Feb. 11, 2015.

(51) Int. Cl.
F01L 1/20 (2006.01)
F01L 1/18 (2006.01)
(Continued)

(52) U.S. Cl.
CPC .............. F01L 1/205 (2013.01); F01L 1/181 (2013.01); F01L 1/20 (2013.01); F01L 2800/01 (2013.01);
(Continued)

(58) Field of Classification Search
USPC .............. 411/222, 209, 315, 393; 123/90.39, 123/90.52, 90.41, 90.16; 74/559
See application file for complete search history.

(56) References Cited

U.S. PATENT DOCUMENTS 652,794 A * 7/1900 Lowe ...................... F16B 19/05
411/361
2,722,204 A * 11/1955 Wente ....................... F01L 1/20
123/90.27
(Continued)

FOREIGN PATENT DOCUMENTS

GB 2203811 A 10/1988
JP 2004360564 A 12/2004
JP 2007177710 A 7/2007

OTHER PUBLICATIONS

JP 2004360564 english language machine translation.*
(Continued)

Primary Examiner — Patrick Hamo
Assistant Examiner — Wesley G Harris
(74) Attorney, Agent, or Firm — Downs Rachlin Martin PLLC (57) ABSTRACT Aspects of the present disclosure are directed to valve clearance adjustment systems and related methods that can be used to quickly and easily establish and accurately fix a desired gap between valve stems and associated valve adjustment screws attached to rocker arms, such as may be used with intake valves, exhaust valves, and fuel-injection mechanisms, among others, within, e.g., an internal combustion engine. Various alternative implementations and related methods are provided.

31 Claims, 7 Drawing Sheets (51) Int. Cl.
- *F16B 35/00* (2006.01)
- *F16B 39/04* (2006.01)
- *F16B 39/12* (2006.01)

(52) U.S. Cl.
- CPC ............ *F16B 35/005* (2013.01); *F16B 39/04* (2013.01); *F16B 39/12* (2013.01)

(56) References Cited

U.S. PATENT DOCUMENTS

| | | | | |
|---|---|---|---|---|
| 3,326,194 | A * | 6/1967 | Haller | F01L 13/00 123/198 R |
| 4,387,680 | A * | 6/1983 | Tsunetomi | F01L 1/181 123/198 F |
| 4,519,345 | A * | 5/1985 | Walter | F01L 13/0021 123/90.16 |
| 4,796,576 | A | 1/1989 | Matsuura et al. | |
| 8,118,004 | B2 * | 2/2012 | Fukami | F01L 1/181 123/90.39 |
| 2004/0045518 | A1 * | 3/2004 | Abe | B21K 1/205 123/90.41 |

OTHER PUBLICATIONS

Dempsey, Wayne R., "911 Valve Adjustment The Backside Method," Oct. 17, 2006. URL: http://www.pelicanparts.com/techarticles/911_backside_valveadjustt/911_backside_valveadjust.htm.

Bennet, Tom, "How-to: Adjust Your Porsche Flat-6 Valves With the VAS-911 Screwdriver," Mar. 22, 2009. URL: https://www.youtube.com/watch?v=0vYHCJy2-8w.

International Search Report and Written Opinion dated Jun. 1, 2016, in connection with PCT/US2016/017334, filed Feb. 10, 2016.

* cited by examiner

VALVE CLEARANCE SETTING AND ADJUSTMENT SYSTEMS AND RELATED METHODS

RELATED APPLICATION DATA

This application claims the benefit of priority of U.S. Provisional Patent Application Ser. No. 62/114,972, filed on Feb. 11, 2015, and titled "VALVE CLEARANCE SETTING AND ADJUSTMENT SYSTEMS AND RELATED METHODS," and U.S. Provisional Patent Application Ser. No. 62/277,087, filed on Jan. 11, 2016, and titled "VALVE CLEARANCE SETTING AND ADJUSTMENT SYSTEMS AND RELATED METHODS," both of which are incorporated by reference herein in their entirety.

FIELD OF THE INVENTION

The present invention generally relates to the field of internal combustion engines. In particular, the present invention is directed to, among other things, setting clearances between rocker arm actuated engine components such as the valve clearance setting adjustment systems (also known as "tappet setting" or "valve lash setting") that are commonly used in the inlet and exhaust valves in the cylinders of internal combustion engines and related methods.

BACKGROUND

While aspects of this disclosure apply to any engine that requires a human to insert a feeler gauge or otherwise mechanically set and adjust valve clearances by hand, the currently understood valve adjustment procedure for the 1965 to 1994 Porsche® 911 engines is used as a basis for the description of various embodiments of the present disclosure. On the pre-1995 Porsche® 911 engine, setting and adjusting the valves is currently performed in several different ways and using several different tools, but always by turning an adjustment screw located in the rocker arm and, once the specified clearance is set, locking the screw down with a lock nut. This process is very difficult to perform with the engine in the car given the small clearances, lack of visibility and manipulation of tools around the engine parts and compartment. The process is still difficult to perform even with the engine out of the car because the tolerances for the adjustment are very small. For example, in the aforementioned Porsche® 911 engines, the gap between the swivel foot of the adjustment screw and the valve stem is specified by the manufacturer at 0.1 mm.

Further, because there are two valve adjustments (an intake and an exhaust) for each of the 911's six cylinders, the process must be repeated 12 times. Even then, because the known procedures are not simple or accurate, it is typically recommended that all clearances be checked twice or even three times before completing the valve adjustment process. The entire process can take several hours for a skilled mechanic and up to two days or more for an unskilled mechanic. Even then, because the process requires human "feel" for the gap at issue and the tightening of the lock nut without movement of the adjustment screw, the actual results obtained can be questionable, even for a skilled mechanic familiar with these types of engines.

For example, with respect to the 911 engine, there are several different known methods of adjusting the valves. Each employs the factory or original equipment manufacturer (OEM) type adjustment screw and a lock nut. The traditional method of valve adjustment is well-described in other publications and the original factory manuals for the engines described. For the 911 engine and with reference to FIG. 1, the traditional method involves loosening a lock nut 100 and inserting a 0.1 mm feeler gauge (not shown) into a very small gap 104 between a swivel foot 108 of an adjustment screw 112 and a valve stem 116. Once in place, adjustment screw 112 is turned until the feeler gauge can barely be removed from gap 104, and then lock nut 100 is tightened down onto a rocker arm 120 with the feeler gauge in place while the adjustment screw is held in place relative to the rocker arm with a screwdriver. This is very difficult to accomplish even for those with experience and especially on the rocker arms located in the back of the 911 engine, such as the rocker arms associated with cylinder number six. One 360-degree radial turn of adjustment screw 112 results in 1 mm of axial travel of swivel foot 108. Thus, the traditional factory-recommended adjustment process for the 911 engine involves ensuring that once gap 104 is set appropriately with the feeler gauge, adjustment screw 112 does not rotate during the lock nut tightening step. This is difficult to achieve even with the engine out of the car, as noted above.

The "backside" method of valve adjustment is also well-described elsewhere, but, for the 911 engine, involves loosening adjustment screw 112 and then inserting a 0.0025 inch feeler into a space between a camshaft lobe (not shown) and a contact surface of the rocker arm at issue. Adjustment screw 112 is then tightened down so that the feeler gauge can barely slip out and then lock nut 100 is tightened down. The "feel" for doing this is subjective. Once the adjustment is locked, if a 0.003 inch feeler gauge cannot fit in the space between the camshaft lobe and the rocker arm contact surface but the 0.0025 inch feeler can, then the spacing of gap 104 is 0.1 mm. The backside method requires removal of engine shrouding surrounding the engine and some exhaust system components and is very difficult to perform on some hard-to-reach cylinders.

Kirk Engines, Inc. has developed a tool (not shown) that operates without a feeler gauge on the principle that turning adjustment screw 112 one tenth of a full radial rotation achieves the desired axial gap of 0.1 mm. First the tool is placed over a 13 mm box end wrench that has been placed on lock nut 100. Then, with the tool, one screws down adjustment screw 112 until contact is made between swivel foot 108 and valve stem 116. The user then moves a pointer to a designated mark on the tool. The user then uses the knurled knob on the tool to rotate engaged adjustment screw 112 counterclockwise to another designated mark that corresponds to ¹⁄₁₀ of a full rotation. This achieves the desired 0.1 mm gap between swivel foot 108 and valve stem 116. Now, the user must hold the Kirk tool in place without moving the knurled knob and using the box end wrench, tighten lock nut 100 down without rotating adjustment screw 112. This is cumbersome and very difficult to accomplish with only two hands in very close quarters and with limited visibility.

Another less often used method of adjusting valves is to employ the use of a Stomski Racing or other jigs and a dial gauge indicator. While providing good accuracy through the use of the dial gauge, this method requires a lot of set up and tear down for each valve, is very hard to set up with the engine in the car given cramped space conditions, and requires expensive tools and a skilled mechanic who has developed a "touch feel" for locking down lock nut 100 while holding adjustment screw 112 in place. This method also requires trial and error adjustments until gap 104 is set to the appropriate spacing and then confirmed with the dial gauge.

The net result of the existing methods of valve adjustment is unsatisfactory. The adjustment is hard to achieve, often inaccurate, not always replicable, and always difficult to perform. As a consequence, some owners spend many hours performing the valve adjustment that is recommended to be performed every 15,000 miles on the 911 engine as normal maintenance. Rechecking and adjustment of the valve clearances is recommended at certain intervals because the valve seat will wear over time and impact the size of gap 104. Further, lock nut 100 can loosen and, thus, allow adjustment screw 112 to move out of the set position. Many owners opt to have a mechanic perform the adjustment at the cost of upwards of $500, and even then the ability of mechanics to achieve the requisite tight tolerances is questionable.

Improperly set valves can damage the engine resulting in thousands of dollars in repair costs and, at the least, cause an otherwise well-engineered and powerful car to perform at well less than optimal levels. The need for a reliable, consistent, replicable, easy, and accurate valve adjustment mechanism has long been sought and desired for the 911 engine and any other engine that features a rocker arm and mechanical valve adjustment screw mechanism.

SUMMARY OF THE DISCLOSURE

Aspects of the present disclosure are directed to valve clearance adjustment systems and related methods that can be used to quickly and easily establish and accurately fix a desired and consistent and replicable gap between valve stems and valve adjustment screws installed in associated rocker arms, such as may be used with intake valves, exhaust valves, and fuel-injection mechanisms, among others, within an internal combustion engine. In an embodiment, an adjustment screw may be positioned, e.g., by manually tightening the adjustment screw with one's fingers, such that an attached swivel foot contacts but does not actuate an associated valve stem thereby establishing a zero gap between the valve stem and the swivel foot. A collar (or barrel or cylinder) may then be positioned on and secured to the adjustment screw such that the bottom of the collar rests against the top surface of an associated rocker arm opposite the swivel foot. With the collar fixed against the adjustment screw, the adjustment screw may then be loosened by turning it counterclockwise such that the attached swivel foot no longer contacts the valve stem. This raises the bottom of the collar that has been affixed to the adjustment screw off the surface of the rocker arm and creates a gap between the collar and rocker arm as well as a corresponding gap between the swivel foot and the valve stem. In the gap between the bottom of the collar and the top of the rocker arm surface created by loosening the adjustment screw, a shim (or retaining ring) with a thickness approximately equal to the desired gap between the swivel foot and valve stem may be inserted. The adjustment screw may then be tightened such that the shim is firmly held in place between the rocker arm and the collar, thus precisely establishing and adjusting the desired valve clearance distance between the swivel foot and the valve stem in accordance with the thickness of the shim. Once the shim is compressed between the collar and the top of the rocker arm, the collar and shim may then be locked down with a lock nut that engages the threads of the adjustment screw and the lock nut may be fixed in place by turning it against the top of the collar. Various alternative implementations and related methods are provided, as briefly summarized immediately below and further described herein.

In one implementation, a method of establishing valve clearance using a valve-clearance and adjustment system to set a valve clearance gap between a valve stem and a valve adjustment screw disposed in a rocker arm, the valve clearance and adjustment system including a shim sized and configured to create a desired valve clearance gap when the shim is secured between a locking mechanism and the rocker arm is provided. The method may include: adjusting the adjustment screw to substantially eliminate the valve clearance gap; positioning at least one component of the locking mechanism on the adjustment screw such that the at least one component of the locking mechanism abuts the rocker arm; adjusting the adjustment screw such that the shim can be placed between the at least one component of the locking mechanism and the rocker arm; positioning the shim around the adjustment screw and between the locking mechanism and the rocker arm; adjusting the adjustment screw such that the shim contacts the rocker arm and the at least one component of the locking mechanism; and arranging the locking mechanism such that the shim is locked in place between the locking mechanism and the rocker arm.

In another implementation, a valve-clearance setting and adjustment system for establishing and adjusting a spacing between a valve stem and a valve adjustment screw is provided. The system may include: a shim sized to be equal in thickness to a desired valve clearance gap between the valve stem and the valve adjustment screw; and a locking mechanism designed and configured to be received on the adjustment screw and to lock the shim in place between the locking mechanism and a rocker arm.

In still another implementation, a rocker arm assembly, comprising at least one rocker arm and a valve-clearance setting and adjustment system designed and configured for use with the at least one rocker arm, is provided. The valve-clearance setting and adjustment system may include: a shim sized to be equal in thickness to a desired valve clearance gap between the valve stem and the valve adjustment screw; and a locking mechanism designed and configured to be received on the adjustment screw and to lock the shim in place between the locking mechanism and a rocker arm.

In yet another implementation, an internal combustion engine is provided. The engine may include: a plurality of pistons; a valve assembly connected to the plurality of pistons for introducing air to the plurality of pistons and exhausting exhaust gases from the plurality of pistons, the valve assembly including a plurality of valve stems; a plurality of rocker arms operatively associated with the valve assembly, each of the rocker arms including a valve adjustment screw for actuating a corresponding one of the valve stems; and a valve-clearance setting and adjustment system connected to at least one of the plurality of rocker arms for setting and adjusting a spacing between a valve adjustment screw and a corresponding one of the valve stems, the valve-clearance setting and adjustment system comprising: a shim sized to be equal in thickness to a desired valve clearance gap between the valve stem and the valve adjustment screw; and a locking mechanism designed and configured to be received on the adjustment screw and to lock the shim in place between the locking mechanism and the at least one of the plurality of rocker arms.

In still yet another implementation, a method of establishing valve clearance using a valve-clearance and adjustment system to set a valve clearance gap between a valve stem and a pin, the valve-clearance and adjustment system including: a hollow shaft designed and configured to replace an adjustment screw in a rocker arm; a pin designed and configured to be slidably received within the shaft; and a shim sized and configured to create a desired valve clearance gap when the shim is secured between a locking mechanism and the shaft or the rocker arm is provided. The method may include: positioning the hollow shaft in the rocker arm in place of the adjustment screw; adjusting the pin to substantially eliminate the valve clearance gap; positioning at least one component of the locking mechanism on the pin such that the at least one component of the locking mechanism abuts the shaft or the rocker arm; adjusting the pin such that the shim can be placed between the at least one component of the locking mechanism and the shaft or the rocker arm; positioning the shim around the pin and between the locking mechanism and the shaft or the rocker arm; adjusting the pin such that the shim contacts both: the at least one component of the locking mechanism; and the shaft or the rocker arm; and arranging the locking mechanism such that the shim is locked in place between: the locking mechanism; and the shaft or the rocker arm.

In a further implementation, a valve-clearance setting and adjustment system for establishing and adjusting a spacing between a valve stem and a pin is provided. The system may include: a hollow shaft designed and configured to replace an adjustment screw in a rocker arm; a pin designed and configured to be slidably received within the shaft; and a shim sized to be equal in thickness to a desired valve clearance gap between the valve stem and the pin.

In another further implementation, a rocker arm assembly, comprising at least one rocker arm and a valve-clearance setting and adjustment system designed and configured for use with the at least one rocker arm is provided. The valve-clearance setting and adjustment system may include: a hollow shaft designed and configured to replace an adjustment screw in a rocker arm; a pin designed and configured to be slidably received within the shaft; and a shim sized to be equal in thickness to a desired valve clearance gap between the valve stem and the pin.

In still another further implementation, an internal combustion engine is provided. The engine may include: a plurality of pistons; a valve assembly connected to the plurality of pistons for introducing air to the plurality of pistons and exhausting exhaust gases from the plurality of pistons, the valve assembly including a plurality of valve stems; a plurality of rocker arms operatively associated with the valve assembly for actuating the plurality of valve stems; and a valve-clearance setting and adjustment system connected to at least one of the plurality of rocker arms for setting and adjusting a spacing between a pin and a corresponding one of the valve stems, the valve-clearance setting and adjustment system comprising: a hollow shaft designed and configured to replace an adjustment screw in the at least one of the plurality of rocker arms; a pin designed and configured to be slidably received within the shaft; and a shim sized to be equal in thickness to a desired valve clearance gap between the valve stem and the pin.

In yet another further implementation, a rocker arm for actuating a valve stem is provided. The rocker arm may include: a hollow shaft with an unthreaded interior designed and configured to slidably receive a pin for actuating the valve stem; and a circular, externally-threaded protrusion adjacent and coaxial to the hollow shaft and located on a side of the rocker arm opposite a side designed to face the valve stem when the rocker arm is properly installed in an engine.

In still yet another further implementation, a rocker arm for actuating a valve stem is provided. The rocker arm may include: an opening designed and configured to receive a valve adjustment screw or to slidably receive a pin for actuating the valve stem; and a circular, externally-threaded protrusion adjacent and coaxial to the opening and located on a side of the rocker arm opposite a side designed to face the valve stem when the rocker arm is properly installed in an engine.

In still yet another further implementation, an internal combustion engine is provided. The engine may include: a plurality of pistons; a valve assembly connected to the plurality of pistons for introducing air to the plurality of pistons and exhausting exhaust gases from the plurality of pistons, the valve assembly including a plurality of valve stems; and a plurality of rocker arms operatively associated with the valve assembly for actuating the plurality of valve stems, wherein at least one of the plurality of rocker arms includes: an opening designed and configured to receive a valve adjustment screw or to slidably receive a pin for actuating a corresponding one of the valve stems; and a circular, externally-threaded protrusion adjacent and coaxial to the opening and located on a side of the rocker arm opposite a side designed to face the corresponding one of the valve stems when the rocker arm is properly installed in the engine.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Aspects of the present disclosure can be used to easily establish and adjust desired clearance between a valve adjustment screw and a valve stem while eliminating the guesswork and "feel" requirement of using feeler gauges in difficult to reach spots and avoiding unintended turning of the adjustment screw out of tolerance when tightening the lock nut. Parts disclosed herein can easily be installed, used, and adjusted on an engine typically without the need to remove any engine shrouding or exhaust components. By using aspects of the present invention, highly accurate, replicable, and expeditious valve clearance settings can be achieved that will not be impacted by adjustment screw and/or lock nut slippage and will be consistent across all valves.

At a high level, aspects of the present disclosure are directed to valve clearance adjustment systems and related methods that can be used to quickly, accurately, and easily establish and fix a desired gap between valve stems and valve adjustment screws on associated rocker arms, such as may be used with intake valves, exhaust valves, and fuel-injection mechanisms, among others, within an internal combustion engine. Exemplary embodiments illustrating aspects of the present disclosure are described below in the context of specific examples. However, it is emphasized that the embodiments described below are only examples; aspects of the present disclosure can be implemented in any of a number of ways in any of a number of different situations.

Figure 1:
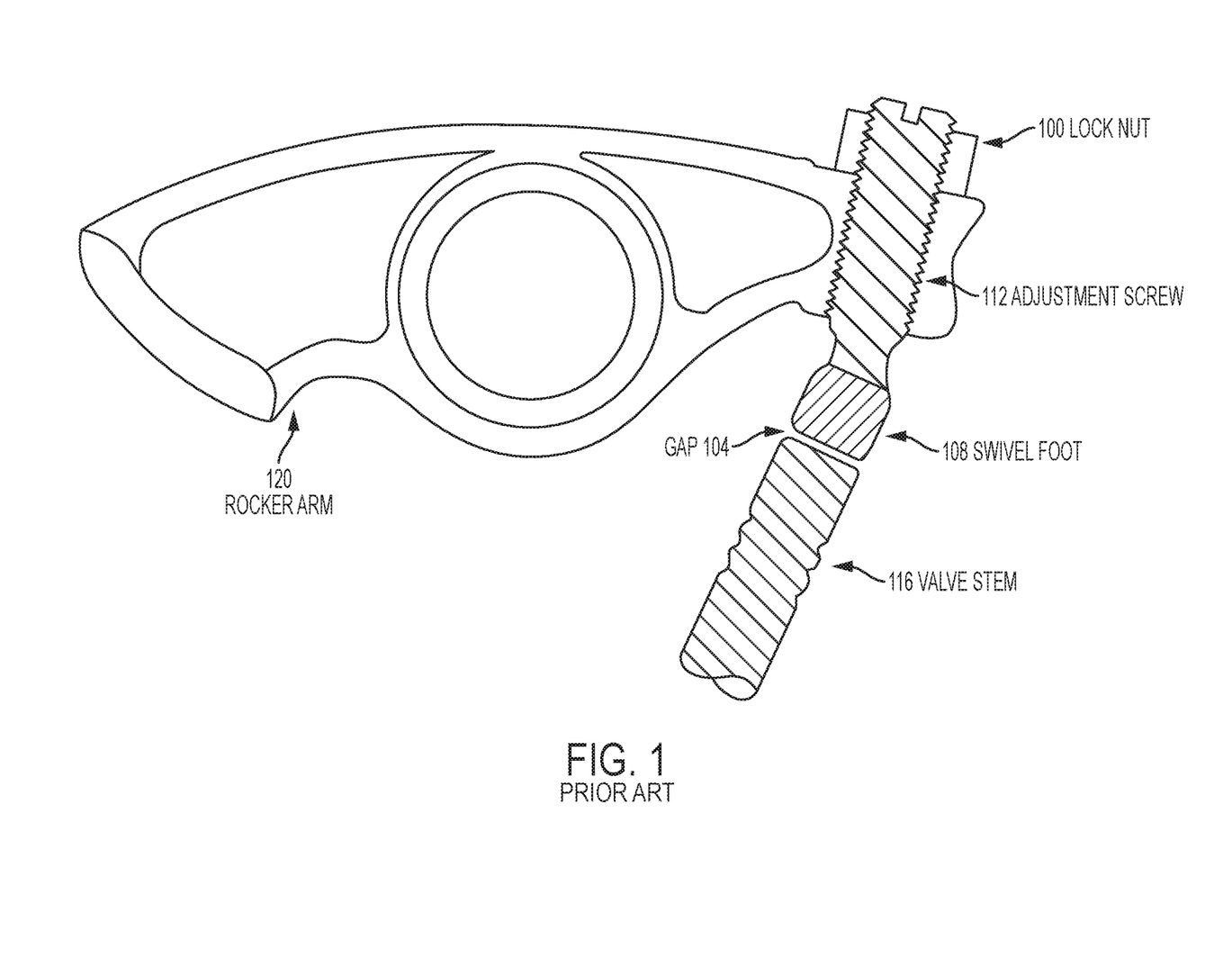
FIG. 1 is a cross-sectional view of various parts included in 1965 to 1994 Porsche® 911 engines.
Figure 2:
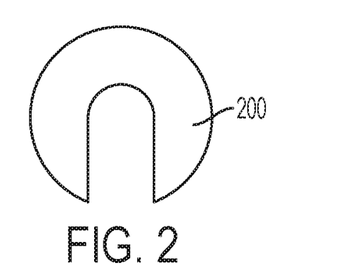
FIG. 2 is a plan view of a shim that can be used to adjust valve clearance according to aspects of the present disclosure.
Figure 3A:
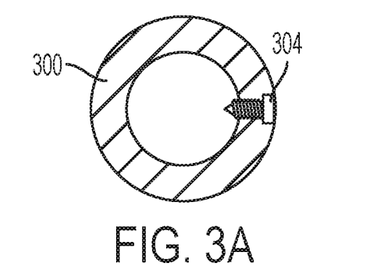
FIG. 3A is a cross-sectional top view of a collar that can be used to adjust valve clearance according to aspects of the present disclosure.
Figure 3B:
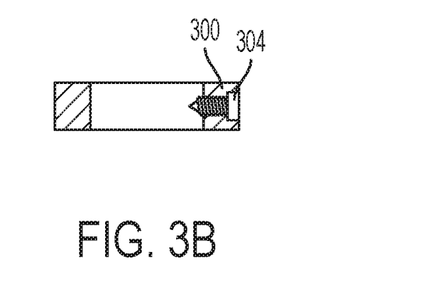
FIG. 3B is a cross-sectional side view of the collar of FIG. 3A.
Figure 3C:
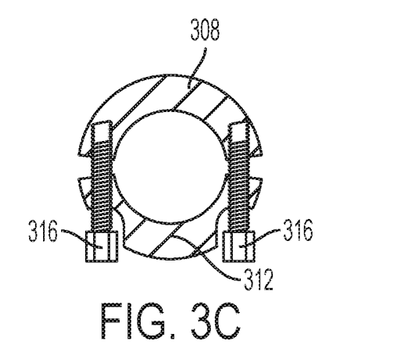
FIG. 3C is a cross-sectional top view of another collar that can be used to adjust valve clearance according to aspects of the present disclosure.
Figure 3D:
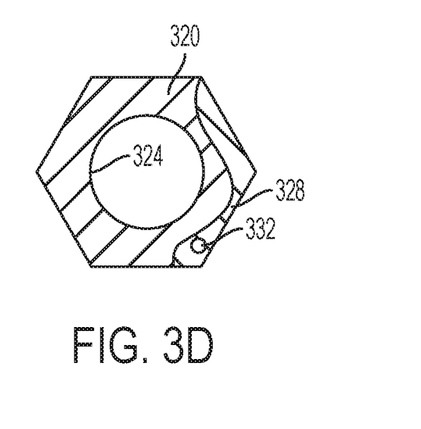
FIG. 3D is a cross-sectional top view of yet another collar that can be used to adjust valve clearance according to aspects of the present disclosure.
Figure 4:
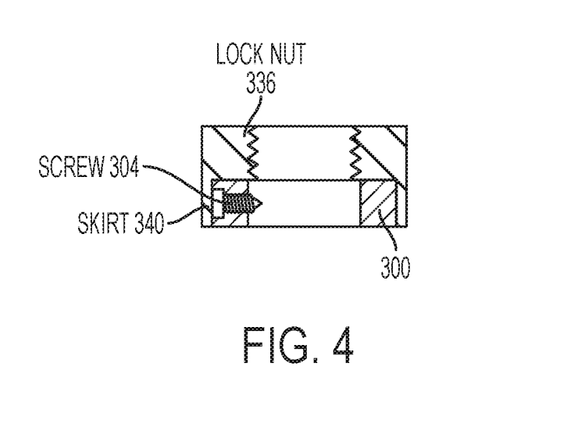
FIG. 4 is a cross-sectional side view of a lock nut with a skirt portion designed to surround a collar that can be used to adjust valve clearance according to aspects of the present disclosure.

Referring now to the drawings, FIGS. 2-4 illustrate various components that can be used to adjust valve clearance according to aspects of the present disclosure. FIG. 2 illustrates a shim 200 that can be used to establish a desired valve clearance gap like gap 104 of FIG. 1 between valve stem 116 and valve adjustment screw 112, as further described hereinbelow, while FIGS. 3A-D illustrate various collars that can be used as a locking mechanism or a portion of a locking mechanism designed and configured to be received and locked in place on a valve adjustment screw (or pin, as discussed further herein) in order to lock the shim in place between the locking mechanism and a rocker arm like rocker arm 120, as also further described hereinbelow. Although shim 200 in FIG. 2 includes a radial opening for receiving a valve adjustment screw, those of ordinary skill in the art will recognize after reading this disclosure in its entirety that the shim can take the form of a washer or any other shape, provided that it is substantially incompressible along its thickness (i.e., such that its thickness remains constant despite pressures applied to it as described herein) and can receive a valve adjustment screw like valve adjustment screw 112 (or pin, as discussed further herein) and establish a desired valve clearance gap like gap 104 between valve stem 116 and valve adjustment screw 112 of FIG. 1. FIGS. 3A-B illustrate a collar 300 with a threaded axial, countersunk bore designed to receive a screw 304, which may be a hex-head or any other type of screw. FIG. 3C illustrates an alternative collar comprising a first portion 308 and a second portion 312 that are designed to receive screws 316 that can be tightened in order to lock the first and second portions to a valve adjustment screw like valve adjustment screw 112. FIG. 3D illustrates another alternative collar comprising a first portion 320 including a central bore (which, along with the other collars described herein, may include a threaded interior surface 324) for receiving a valve adjustment screw like valve adjustment screw 112 and a cam-operated clamp 328 or lever that can be closed (as shown in FIG. 3D) to lock the first portion to the valve adjustment screw and opened (pulled away from the first portion about axis 332) to release the first portion from the valve adjustment screw. In various embodiments, as described further hereinbelow, one of the collars of FIGS. 3A-D, among others known in the art, can be secured to a valve adjustment screw with a shim like shim 200 of FIG. 2 interposed between the collar and a rocker arm like rocker arm 120 of FIG. 1 in order to establish a desired valve clearance gap like gap 104 between valve stem 116 and valve adjustment screw 112 of FIG. 1. In some embodiments, a lock nut like lock nut 100 of FIG. 1 may be used to lock the collar and shim in place. FIG. 4 illustrates an alternative lock nut 336 with an attached "skirt" portion 340 that can be used to both lock the collar and shim in place and to capture one or more screws used to secure a collar to an adjustment screw (or pin, as discussed further herein), such as screw 304 of FIGS. 3A-B or screws 316 of FIG. 3C, so that the one or more screws cannot be removed, either accidentally as a result of vibration or intentionally, without first removing or loosening the lock nut such that the skirt portion no longer captures the one or more screws.

Figure 5:
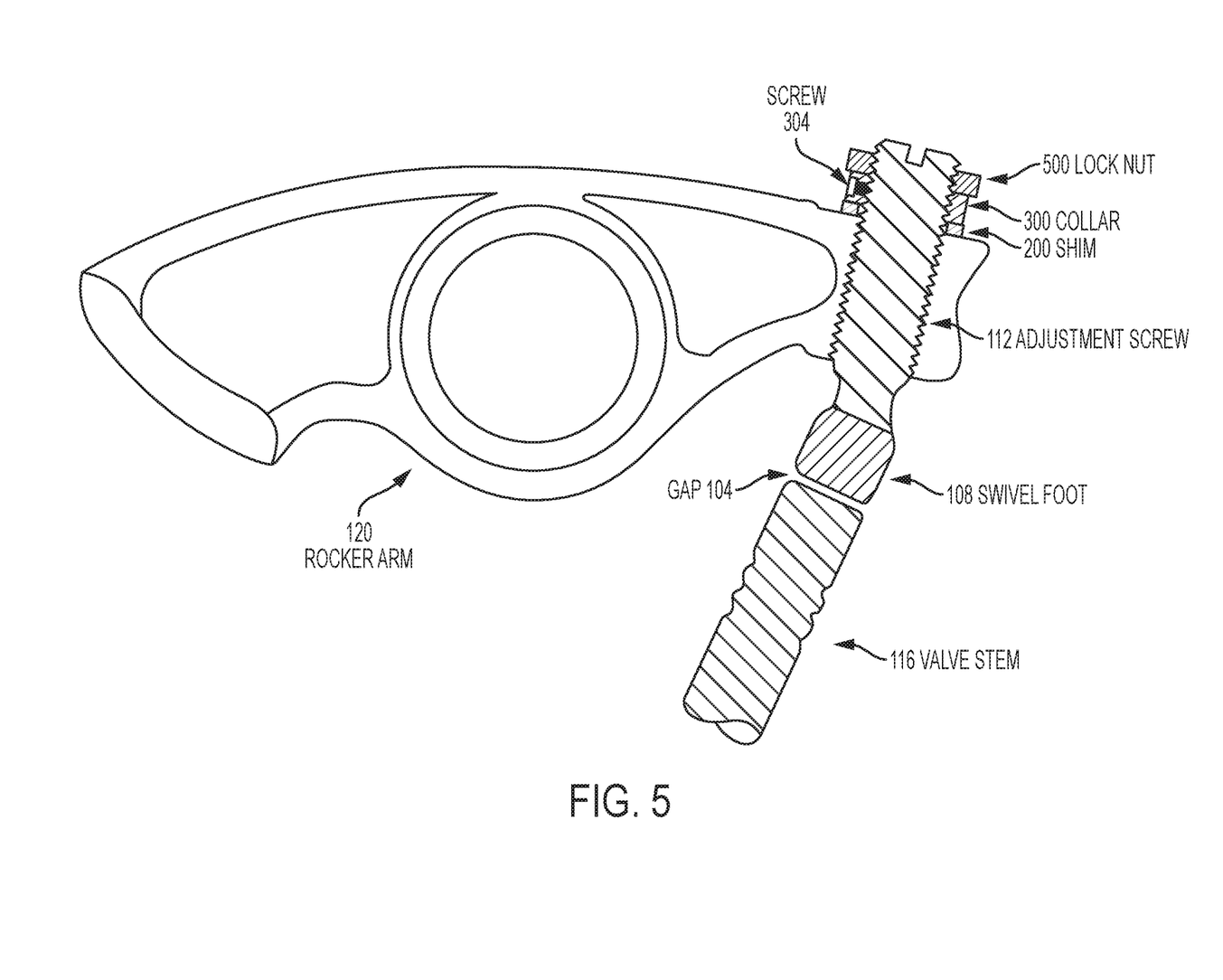
FIG. 5 is a cross-sectional view illustrating one technique and system that can be used to adjust valve clearance according to aspects of the present disclosure.
Figure 6A:
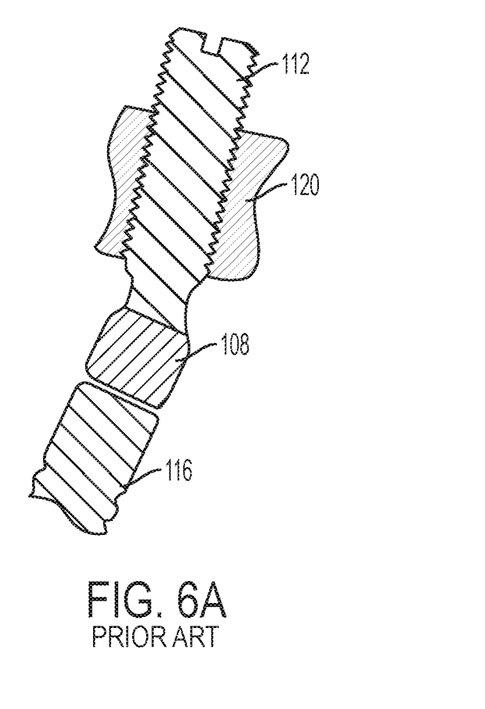
FIG. 6A is a cross-sectional side view of a subset of the parts shown in FIG. 1.
Figure 6B:
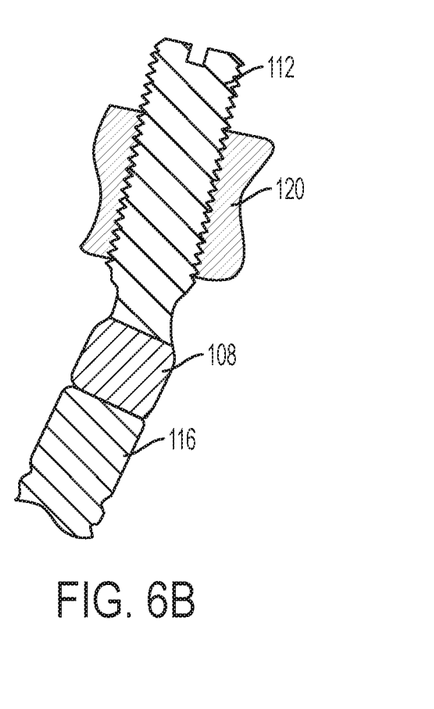
FIG. 6B is a cross-sectional side view illustrating the parts of FIG. 6A after performing one step of a method that can be used to adjust valve clearance according to aspects of the present disclosure.
Figure 6C:
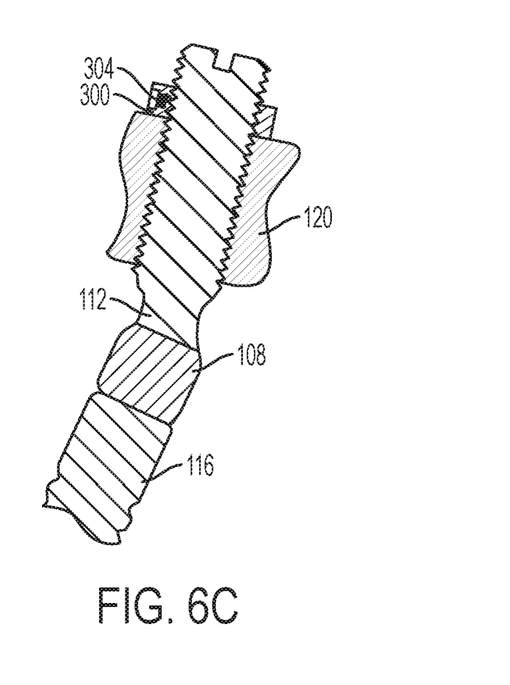
FIG. 6C is a cross-sectional side view illustrating the parts of FIG. 6B after performing another step of a method that can be used to adjust valve clearance according to aspects of the present disclosure.
Figure 6D:
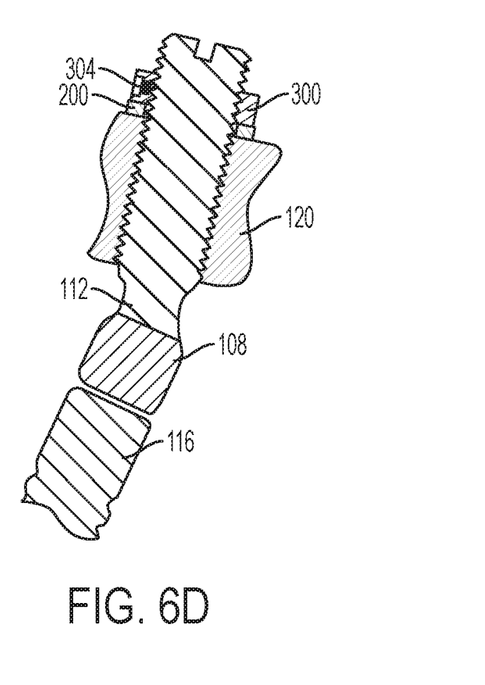
FIG. 6D is a cross-sectional side view illustrating the parts of FIG. 6C after performing yet another step of a method that can be used to adjust valve clearance according to aspects of the present disclosure.

FIGS. 5 and 6A-D illustrate an exemplary system and technique that can be used to set and adjust valve clearance using components of FIGS. 2, 3A, and 3B. As shown in FIG. 6B, adjustment screw 112 may be positioned, e.g., by manually tightening the adjustment screw with one's fingers until it is finger-tight, such that attached swivel foot 108 contacts but does not actuate (i.e., displace) associated valve stem 116. As shown in FIG. 6C, a collar (or barrel or cylinder), here collar 300 of FIGS. 3A-B, may then be positioned on and secured to (e.g., using countersunk hex-head screw 304 in the side of the collar, preferably fabricated from relatively soft but durable materials such that, when tightened, the screw can grip the threads of adjustment screw 112 without damaging the threads) the adjustment screw such that the bottom of the collar rests against the upper surface of associated rocker arm 120 opposite swivel foot 108. Adjustment screw 112 may then be loosened by turning it counterclockwise (either by hand or with a tool such as a wrench or screwdriver) such that attached swivel foot 108 no longer contacts valve stem 116. Loosening adjustment screw 112 raises attached collar 300 off the surface of rocker arm 120 a distance equal to a corresponding resulting gap, here gap 104, between swivel foot 108 and valve stem 116. In the gap between collar 300 and rocker arm 120 created by loosening adjustment screw 112, a shim (or retaining ring) with a thickness approximately equal to the desired final gap between the swivel foot and valve stem (0.1 mm in the case of the 911 engine, although other thicknesses can be used as required for different engines or valves), here shim 200, may be inserted. In some embodiments, shim 200 may be substantially "U-shaped," as shown in FIG. 2, so that it may be positioned on adjustment screw 112 with collar 300 locked in place by inserting the shim into position from the side. Adjustment screw 112 may then be tightened by turning clockwise such that shim 200 is firmly held in place between rocker arm 120 and collar 300, as shown in FIGS. 5 and 6D, thus precisely adjusting the corresponding valve clearance distance between valve stem 116 and swivel foot 108 of the adjustment screw in accordance with the thickness of the shim. A lock nut 500, as shown in FIG. 5, which may be identical to lock nut 100 in some embodiments, may then be threaded onto adjustment screw 112 until the lock nut is firmly seated against the top of collar 300 thereby locking the collar and underlying shim 200 in place against rocker arm 120 and holding the adjustment screw in place. Next, the screw(s) or other mechanism used to secure the collar against the adjustment screw may be removed if desired, such that a single hex-head screw or other such mechanism can be used to secure collars on all valve adjustment screws in an engine, effectively reducing the number of parts necessary to implement aspects of the present disclosure on more than one valve adjustment screw. Optionally, the lock nut may include a skirt portion, as shown in FIG. 4, that encloses a portion or all of the collar such that the hex-head screw or other mechanism used to secure the collar against the adjustment screw cannot work its way out of or away from the collar.

Accordingly, a system, or assembly of parts or tools, can be provided to enable such a technique as described herein, including a collar like collar 300 (or other mechanism such as a clamp or other fixable ring that can be secured in a "zero gap" position against the adjustment screw, as shown in FIG. 6C), a mechanism for securing the collar to an adjustment screw like screw 304 (e.g., a hex-head screw with a flat tip, although other mechanisms could be provided, such as a hex-head screw with a pointed tip and/or a non-hex-head screw), and an appropriately sized and shaped shim like shim 200 for establishing the desired valve clearance spacing distance between the valve stem and the swivel foot of the adjustment screw, i.e., gap 104.

Various mechanisms for securing a collar to adjustment screw 112 (or pin, as discussed further herein) may be provided, such as recessed-screw clamping collars like those of FIGS. 3A-C, among others. In some implementations, such a mechanism may be partially or entirely built-in to the collar itself, e.g., by including a collet (not shown) on the collar with associated threads such that a separate nut may be threaded onto the collar to secure the collar to the adjustment screw. In some embodiments, a collar may be affixed to an adjustment screw by means of a collet or an internal axially positioned screw within the adjustment screw (not shown) that expands the adjustment screw surface against the collar thereby fixing the two against each other. In some embodiments, as mentioned above, a lock nut with a skirt portion like that of FIG. 4 may be provided with such a system, but such a custom lock nut may not always be necessary or desirable. For example, in many implementations, original lock nut 100 provided with a vehicle from the factory can be used to secure a collar, shim, and adjustment screw 112 in place. In implementations that use a hex-head screw to secure the collar to adjustment screw 112, such a custom lock nut including a skirt portion may be necessary or desirable to prevent the hex-head screw or other securing mechanisms from falling out or loosening; alternatively, as mentioned above, the hex-head screw or other mechanism for securing the collar to the adjustment screw can be removed altogether once the mechanism has been locked in place with a lock nut. In some embodiments, a preferably non-permanent chemical thread locking material may be used to secure the hex-head screw within the collar and/or to fix the collar to the adjustment screw.

Figure 7:
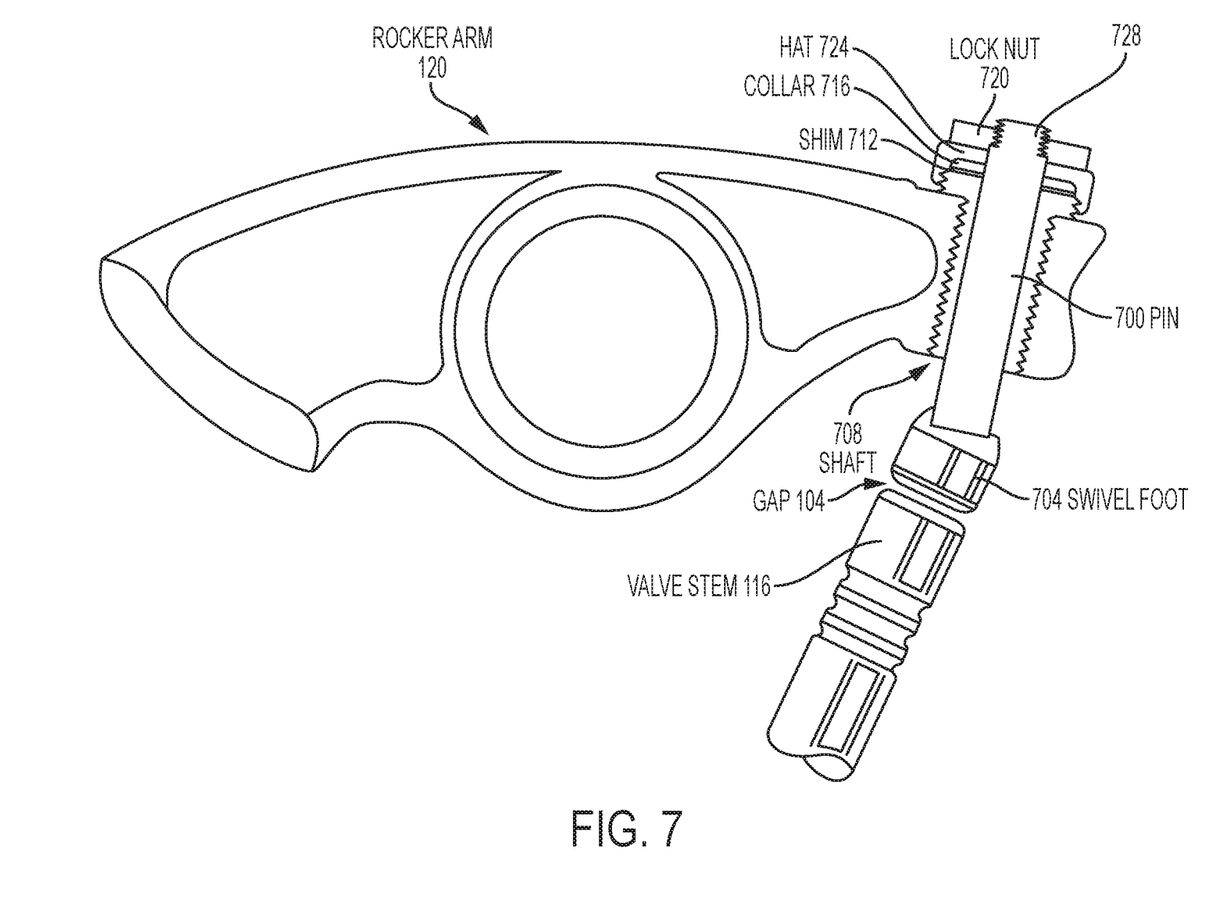
FIG. 7 is a diagram illustrating another technique and system that can be used to adjust valve clearance according to aspects of the present disclosure.

FIG. 7 illustrates an embodiment in which a new mechanism is substituted for a factory-provided adjustment screw and lock nut like those of FIG. 1. In this implementation, new parts (pin 700 with attached swivel foot 704, threaded shaft 708, shim 712, collar 716, and optional lock nut 720 and/or "hat" 724) replace OEM adjustment screw 112 and lock nut 100, which allows for easy valve clearance adjustment. Various parts and techniques described herein can be designed to fit existing rocker arms and/or used in newly manufactured rocker arms that have been modified or originally manufactured to accommodate various aspects of the present disclosure. Various ones of the parts shown in FIG. 7 can be used to replace existing valve adjustment screw 112 and lock nut 100 found in rocker arms like rocker arm 120 of internal combustion engines that require the periodic use of a feeler gauge or other tools operated by a human to adjust gap 104 between intake and exhaust valve stems, among others, and their corresponding adjustment screw swivel feet, such as valve stem 116 and swivel foot 108. This implementation allows for easy and accurate setting of valves to factory specification without the need for readjustment due to slippage of various currently used OEM valve adjustment screws and lock nuts such as valve adjustment screw 112 and lock nut 100. By providing a replacement for the existing valve adjustment screws and lock nuts that are traditionally used, the cumbersome, difficult, and inaccurate current procedures and tools presently used to adjust valves on these types of engines can be eliminated As seen in FIG. 7, in an embodiment, a valve-adjustment system may include pin 700 with attached swivel foot 704 attached at one end (similar or identical to swivel foot 108 of valve adjustment screw 112) that is received with a sliding fit in shaft 708 that is screwed into an adjustment screw bore in the adjustment end (i.e., right-hand side relative to FIG. 7) of a rocker arm like rocker arm 120. Shim 712, which may be substantially identical to shim 200, fits around pin 700 and is located immediately above rocker arm 120 and shaft 708 to set the desired gap below the rocker arm between swivel foot 704 and valve stem 116. To set the gap using an implementation like that shown in FIG. 7, first, a zero gap between swivel foot 704 and valve stem 116 can be achieved by pushing pin 700 down so as to rest the swivel foot firmly against the valve stem (but, again, without actuating or displacing the valve stem). The zero gap position between swivel foot 704 and valve stem 116 can then be fixed on pin 700 by installing and securing locking collar 716 such that it rests directly above and on the top of rocker arm 120 and shaft 708 such that the collar is firmly secured to the pin. Then, pin 700 and collar 716 affixed thereto can be lifted and shim 712 having a thickness corresponding to desired valve adjustment gap 104 between swivel foot 704 and valve stem 116 can be placed between the collar and the top of shaft 708 and/or rocker arm 120. When shim 712 is secured in place under collar 716 and against shaft 708 and/or rocker arm 120, a gap, here gap 104, substantially equal to the thickness of the shim is established in the desired location below rocker arm 120 between swivel foot 704 and valve stem 116. Once the desired gap is set using shim 712, then pin 700, the shim, and collar 716 can then be immovably fixed to the shaft and/or rocker arm by well-known means, such as a lock nut like lock nut 720 threaded onto a threaded end 728 of the pin, as shown in FIG. 7. However, in some embodiments, such a lock nut may be omitted or complemented with other securing means; for example, as shown in FIG. 7, a "hat" component 724 may be threaded onto optional external threads of an optional portion of shaft 708 that extends above the rocker arm, as shown in FIG. 7, which may eliminate the need for a separate lock nut like lock nut 720, depending on how the shaft is installed. In some embodiments, shaft 708 may be installed by merely threading it into the former location of an adjustment screw like adjustment screw 112 of FIG. 1; however, to eliminate the need for a lock nut in an embodiment like that of FIG. 7, such a shaft may be installed by first applying a permanent chemical thread locking material to the exterior of the shaft and then threading it into the former location of the adjustment screw.

In some embodiments, an OEM rocker arm like rocker arm 120 can be modified or replaced with new rocker arm design. Such a modification may involve permanently affixing a shaft like shaft 708 of FIG. 7 and/or the optional portion of the shaft extending above the rocker arm in FIG. 7 to a rocker arm like rocker arm 120 of FIG. 1, as described above; similarly, a new rocker arm design (not shown) may comprise a rocker arm fabricated to include portions like those of shaft 708 of FIG. 7 and/or the optional portion of the shaft extending above the rocker arm in FIG. 7. By including the optional portion of the shaft extending above the rocker arm in a modified or new rocker arm, "hat" component 724 of FIG. 7 can be secured to external threads that are a permanent feature of the rocker arm. Additionally or alternatively to including the optional portion of the shaft extending above the rocker arm shown in FIG. 7, an internally-threaded bore may be disposed in a shaft like shaft 708 of FIG. 7, in a portion of the shaft extending above the rocker arm similar to that shown in FIG. 7, or directly in a new rocker arm design proximal a shaft like that of FIG. 7, such that a "hat" component like "hat" component 724 of FIG. 7, but with additional or alternative external threads, can be secured into the bore.

Accordingly, a system, or assembly of parts, can be provided to enable an implementation like that shown in FIG. 7, including pin 700 with attached swivel foot 704, shaft 708, collar 716, a mechanism for securing the collar to the pin (e.g., one or two hex-head screws, although other mechanisms could be provided, as described above), and appropriately sized and shaped shim 712 for establishing the desired valve clearance spacing (i.e., gap 104) distance between valve stem 116 and swivel foot 704 of the pin. Various mechanisms for securing collar 716 to pin 700 may be provided, such as those described above, among others.

In order to confirm the proper thicknesses for shims or retaining rings that can be used in accordance with aspects of the present disclosure, as such thicknesses may not necessarily correspond precisely to the desired valve clearance spacing, a dial gauge and various thicknesses of shims or retaining rings can be used. For example, after installing a shim of a nominal thickness in accordance with the systems described by the foregoing embodiments, one may securely position a dial gauge such that it rests against and can measure axial movement of valve adjustment screw 112 or pin 700, push the already installed locked adjustment screw or pin, shim 200 or 704, collar 300 or 716, and rocker arm 120 down until the gap between swivel foot 108 or 704 and valve stem 116 has been closed, tare (or "zero") the dial gauge, and then lift up on the rocker arm such that the maximum mechanical gap allowed is established between the swivel foot and valve stem. This will produce a reading on the dial gauge that will indicate whether the thickness of the selected and installed shim has created the desired gap between valve stem 116 and swivel foot 108 or 704.

Figure 8:
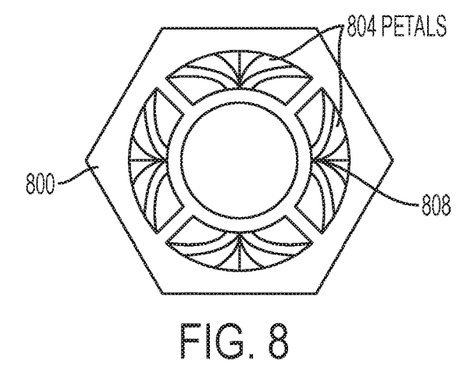
FIG. 8 is a plan view of a lower portion of a collar that can be used to adjust valve clearance according to aspects of the present disclosure.
Figure 9A:
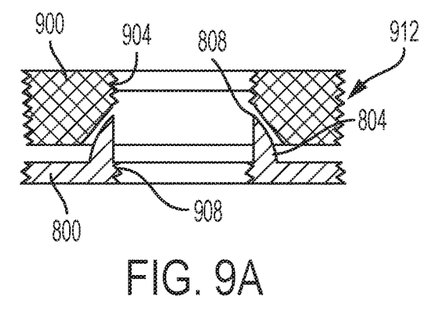
FIG. 9A is a cross-sectional side view of a collar that can be used to adjust valve clearance according to aspects of the present disclosure.
Figure 9B:
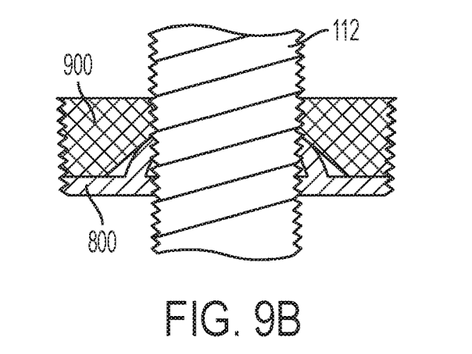
FIG. 9B is a cross-sectional side view of the collar of FIG. 9A when it is located on an adjustment pin and locked in place.
Figure 10:
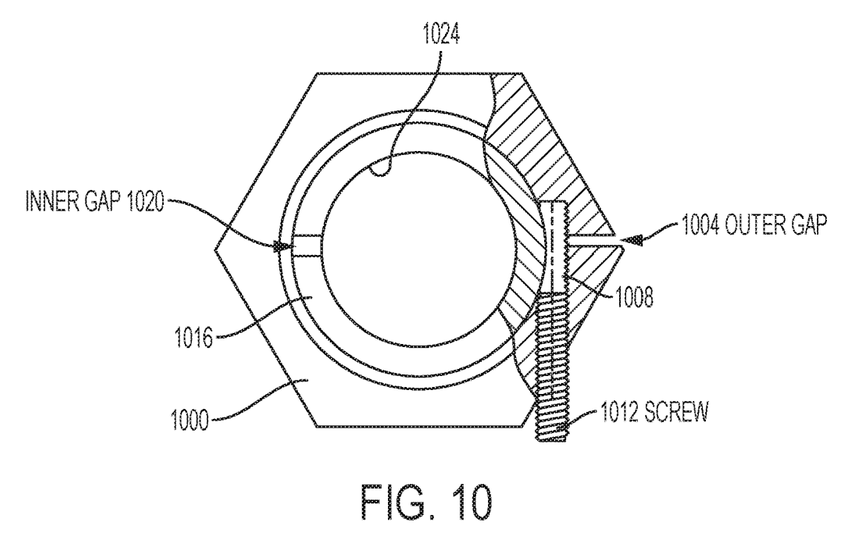
FIG. 10 is a plan view of another collar that can be used to adjust valve clearance according to aspects of the present disclosure with a partial cross-sectional view illustrating various components thereof.

Various alternative collars, which may comprise a locking mechanism or a portion of a locking mechanism, are shown in FIGS. 8-10. For example, FIG. 8 illustrates a lower portion 800 of a compression fitting comprising a plurality of petals 804 including deformable portions 808. As shown in FIGS. 9A-B, by compressing an upper portion 900 of a compression fitting having an upper threaded and lower conically shaped inner bore 904 against lower portion 800, which may also include a threaded inner bore 908, deformable portions 808 of petals 804 can be made to grip the threads of adjustment screw 112 (or outer surface of pin 700). In some embodiments, compression between upper portion 900 and lower portion 800 may be established by turning the upper portion relative to an adjustment screw 112 with either a wrench or one's fingers while gripping an optionally knurled outer edge 912 of the upper portion (the lower portion may also optionally include such a knurled outer edge to facilitate hand tightening, as shown in FIGS. 9A-B). In some embodiments, in addition to or as an alternative to a conically shaped inner bore, upper portion 900 may include one or more hex-head or other tightening screws (not shown) operable to compress and deform one or more of petals 804 against the side of valve adjustment screw 112 or pin 700.

In some embodiments, as shown in FIG. 10, a collar with a hexagonal outer portion 1000 sized to accommodate a socket wrench or other wrench may include an outer gap 1004 operably associated with a threaded bore 1008 designed to accommodate a locking screw 1012 for affixing the collar to adjustment screw 112. By screwing locking screw 1012 into bore 1008, outer gap 1004 can be reduced in size and, additionally or alternatively, in some embodiments, the locking screw may compress an inner portion 1016, causing an inner gap 1020 in the inner portion to be reduced in size. By virtue of inner gap 1020 reducing in size, inner portion 1016 can be made to grip adjustment screw 112 via a threaded inner surface 1024. In use, after establishing a zero gap and positioning the collar of FIG. 10 on adjustment screw 112 adjacent rocker arm 120 (resulting in a configuration similar to the configuration shown in FIG. 6C), a wrench may optionally be used to tighten the collar against the top of rocker arm 120 at a specified torque that is less than the torque required to actuate the valve spring and/or valve stem and thereby pre-load the threads of the adjustment screw. The specified torque would be a value sufficient to preload adjustment screw 112 and thereby take up any excess space between the screw threads and the receiving threads of rocker arm 120, while not of sufficient torque to turn the adjustment screw and thereby overcome the valve spring and actuate and displace associated valve stem 116. Once the collar has been tightened to the specified torque between adjustment screw 112 and the surface of rocker arm 120, locking screw 1012 may be tightened to close inner gap 1020 and firmly lock the collar to the adjustment screw. In some embodiments, rather than using a wrench to tighten a collar to a specified torque in order to pre-load adjustment screw 112, the exterior surface of the collar may be knurled or otherwise configured so that sufficient preloading may be accomplished by gripping the collar with one's fingers or other means and tightening it without sufficient torque to displace or actuate the axial position of valve stem 116.

Further, in some embodiments, a smooth bore flexible barrel or cylinder (not shown) may be positioned between a collar and valve adjustment screw 112 or pin 700. When tightening an appropriate collar against the flexible barrel using one or more tightening means, such as hex-head or other screws or cam-operated levers, the flexible barrel may grip the threads of adjustment screw 112 or the outer surface of pin 700. The inner barrel may include rounded or flat sides against which the collar and/or tightening means could bear. In some embodiments, similar to inner gap 1020 of inner portion 1016 of the collar of FIG. 10, the flexible barrel may be partly or fully split in one or more places to create gaps to make it more flexible. Additionally or alternatively, the flexible barrel may be formed from relatively softer material than the collar and, thus, deform to tightly grip adjustment screw 112 or pin 700 when the collar is tightened against the flexible barrel.

After backing adjustment screw 112 out of rocker arm 120, inserting a shim like shim 200, and screwing the adjustment screw back into the rocker arm so that the shim is firmly held in place (similarly to the configuration of FIG. 6D), the adjustment screw may then be tightened with a torque wrench to the previously specified torque value such that the adjustment screw is returned to its pre-loaded setting without displacing the associated valve stem and the shim is firmly held in place between the rocker arm and the collar, thus precisely establishing and adjusting the desired valve clearance distance between swivel foot 108 or 704 and valve stem 116 in accordance with the thickness of the shim.

Figure 11:
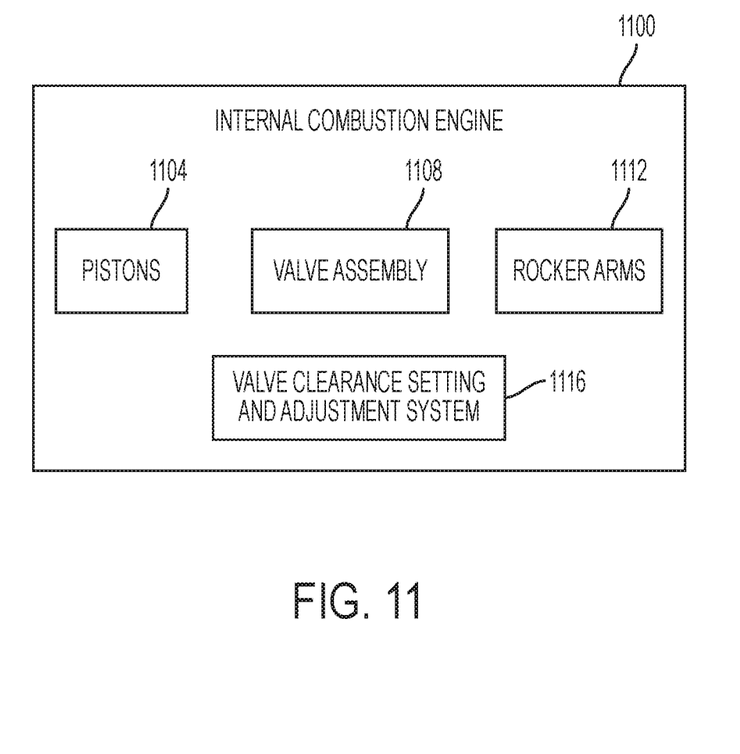
FIG. 11 is a block diagram of an internal combustion engine utilizing a valve-clearance setting and adjustment system according to aspects of the present disclosure.

FIG. 11 shows that valve-clearance setting and adjustment systems according to aspects of the present disclosure can be included in an internal combustion engine 1100 comprising: a plurality of pistons 1104; a valve assembly 1108 connected to the plurality of pistons for introducing air to the plurality of pistons and exhausting exhaust gases from the plurality of pistons, the valve assembly including a plurality of valve stems; a plurality of rocker arms 1112 operatively associated with the valve assembly, each of the rocker arms including a valve adjustment screw or pin for actuating a corresponding one of the valve stems; and a valve-clearance setting and adjustment system 1116 according to aspects of the present disclosure connected to at least one of the plurality of rocker arms for setting and adjusting a spacing between a valve adjustment screw or pin and a corresponding one of the valve stems.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of establishing valve clearance using a valve-clearance and adjustment system to set a valve clearance gap, wherein a size of the valve clearance gap is adjustable with a valve adjustment screw disposed in a rocker arm, the valve clearance and adjustment system including a shim sized and configured to create a desired valve clearance gap when the shim is secured between a locking mechanism and the rocker arm, the method comprising:
　adjusting the valve adjustment screw to eliminate the valve clearance gap;
　positioning at least one component of the locking mechanism on the valve adjustment screw such that the at least one component of the locking mechanism abuts the rocker arm;
　adjusting the valve adjustment screw such that the shim can be placed between the at least one component of the locking mechanism and the rocker arm;
　positioning the shim between the locking mechanism and the rocker arm;
　adjusting the valve adjustment screw such that the shim contacts the rocker arm and the locking mechanism; and
　arranging the locking mechanism such that the shim is locked in place between the locking mechanism and the rocker arm.

2. A method according to claim 1, wherein the locking mechanism comprises a lock nut, and arranging the locking mechanism includes adjusting the lock nut.

3. A method according to claim 1, wherein the at least one component of the locking mechanism comprises a collar designed and configured to fit around the valve adjustment screw and the locking mechanism further includes a securing mechanism for securing the collar to the valve adjustment screw, wherein positioning the at least one component of the locking mechanism includes securing the collar to the valve adjustment screw with the securing mechanism such that the collar abuts the rocker arm.

4. A method according to claim 3, wherein the locking mechanism further comprises a lock nut, and arranging the locking mechanism includes adjusting the lock nut.

5. A method according to claim 3, wherein the collar includes a threaded interior surface for receiving the valve adjustment screw.

6. A method according to claim 3, wherein the securing mechanism includes a screw.

7. A method according to claim 3, wherein the securing mechanism includes a lock nut.

8. A method according to claim 3, wherein the collar has a bottom side configured to abut the shim and a top side opposite the bottom side, wherein the securing mechanism extends from the top side.

9. A method according to claim 1, wherein the locking mechanism comprises a collar designed and configured to fit around the valve adjustment screw, the collar including a securing mechanism for securing the collar to the valve adjustment screw, wherein positioning the at least one component of the locking mechanism includes securing the collar to the valve adjustment screw with the securing mechanism such that the collar abuts the rocker arm.

10. A method according to claim 1, wherein the locking mechanism includes a shaft collar.

11. A method according to claim 10, wherein the shaft collar includes a threaded interior surface for receiving the valve adjustment screw.

12. A valve-clearance setting and adjustment system for establishing and adjusting a valve clearance gap with a valve adjustment screw disposed in a rocker arm, wherein the rocker arm has a first end and a second end, and opposing top and bottom surfaces each extending from the first end to the second end, wherein a portion of the bottom surface faces a valve stem, wherein the valve clearance gap is located between the valve stein and an opposing surface, the system comprising:
   a shim; and
   a locking mechanism designed and configured to be received on the valve adjustment screw and to lock the shim in place between the locking mechanism and the top surface of the rocker arm;
   wherein the shim has a thickness substantially equal to a predetermined size of the valve clearance gap.

13. A valve-clearance setting and adjustment system according to claim 12, wherein the locking mechanism includes a lock nut.

14. A valve-clearance setting and adjustment system according to claim 12, wherein the locking mechanism includes:
   a collar designed and configured to fit around the valve adjustment screw; and
   a securing mechanism for securing the collar to the valve adjustment screw.

15. A valve-clearance setting and adjustment system according to claim 14, wherein the locking mechanism further includes a lock nut.

16. A valve-clearance setting and adjustment system according to claim 14, wherein the collar includes a threaded interior surface for receiving the valve adjustment screw.

17. A valve-clearance setting and adjustment system according to claim 14, wherein the securing mechanism includes a screw.

18. A valve-clearance setting and adjustment system according to claim 14, wherein the securing mechanism includes a lock nut.

19. A valve-clearance setting and adjustment system according to claim 12, wherein the rocker arm pivots about a pivot point, wherein the pivot point is located between the first and second ends.

20. A valve-clearance setting and adjustment system according to claim 12, wherein the shim is configured and dimensioned to be installed around at least a portion of the valve adjustment screw and between the locking mechanism and the rocker arm after the locking mechanism is disposed on the valve adjustment screw.

21. A valve-clearance setting and adjustment system according to claim 12, wherein the locking mechanism includes a shaft collar.

22. A valve-clearance setting and adjustment system according to claim 21, wherein the shaft collar includes a threaded interior surface for receiving the valve adjustment screw.

23. A rocker arm assembly, comprising at least one rocker arm and a valve-clearance setting and adjustment system designed and configured for use with the at least one rocker arm for establishing and adjusting a valve clearance gap, wherein the rocker arm has a first end and a second end, and top and bottom surfaces each extending from the first end to the second end, wherein a portion of the bottom surface faces a valve stem, the valve clearance gap being located between the valve stem and an opposing surface, the valve-clearance setting and adjustment system comprising:
   a shim designed and configured to be disposed around at least a portion of a valve adjustment screw; and
   a locking mechanism designed and configured to be received on the valve adjustment screw and to lock the shim in place between the locking mechanism and the top surface of the rocker arm;
   wherein the shim has a thickness approximately substantially equal to a predetermined size of the valve clearance gap.

24. A rocker arm assembly according to claim 23, wherein the locking mechanism includes a lock nut.

25. A rocker arm assembly according to claim 23, wherein the locking mechanism includes:
   a collar designed and configured to fit around the valve adjustment screw; and
   a securing mechanism for securing the collar to the valve adjustment screw.

26. A rocker arm assembly according to claim 25, wherein the locking mechanism further includes a lock nut.

27. A rocker arm assembly according to claim 25, wherein the locking mechanism includes a collar designed and configured to fit around the valve adjustment screw, the collar including a securing mechanism for securing the collar to the valve adjustment screw.

28. A rocker arm assembly according to claim 23, wherein, wherein the rocker arm pivots about a pivot point, wherein the pivot point is located between the first and second ends.

29. A valve-clearance setting and adjustment system for establishing and adjusting a valve clearance gap, the valve clearance gap adjustable with a valve adjustment screw disposed in a rocker arm, wherein the rocker arm has a first end and a second end, opposing top and bottom surfaces each extending from the first end to the second end, wherein a portion of the bottom surface faces a valve stem, the valve clearance gap being located between the valve stein and an opposing surface, the system comprising:

a shim; and a collar designed and configured to be received on the valve adjustment screw and to lock the shim in place between the collar and the top surface of the rocker arm;

wherein the shim has a thickness approximately substantially equal to a predetermined size of the valve clearance gap and is configured and dimensioned to be installed around at least a portion of the valve adjustment screw.

30. A valve-clearance setting and adjustment system according to claim 29, wherein the collar includes a threaded interior surface for receiving the valve adjustment screw and a screw for securing the collar to the valve adjustment screw.

31. A valve-clearance setting and adjustment system according to claim 29, wherein the collar is a lock nut.

* * * * *

UNITED STATES PATENT AND TRADEMARK OFFICE
CERTIFICATE OF CORRECTION

PATENT NO. : 10,557,382 B2
APPLICATION NO. : 15/549293
DATED : February 11, 2020
INVENTOR(S) : R. Bradford Fawley Page 1 of 1

It is certified that error appears in the above-identified patent and that said Letters Patent is hereby corrected as shown below:

In the Claims

Column 15, Claim 12, Line 40, delete the word "stein" and insert the word --stem-- therefor;

Column 16, Claim 23, Line 37, delete the word "approximately";

Column 16, Claim 28, Line 56, delete the first occurrence of the word "wherein,";

Column 16, Claim 29, Line 66, delete the word "stein" and insert the word --stem-- therefor; and Column 17, Claim 29, Line 6, delete the word "approximately".

Signed and Sealed this
Thirteenth Day of October, 2020

Andrei Iancu
*Director of the United States Patent and Trademark Office*